United States Patent [19]

Schulz et al.

[11] Patent Number: 5,372,045
[45] Date of Patent: Dec. 13, 1994

[54] BRIDGE PULSE CONTROLLED CONSTANT CURRENT DRIVER FOR MAGNETIC FLOWMETER

[75] Inventors: Robert K. Schulz, Plymouth; John D. Pro, Prior Lake, both of Minn.

[73] Assignee: Rosemount Inc., Eden Prairie, Minn.

[21] Appl. No.: 17,686

[22] Filed: Feb. 12, 1993

[51] Int. Cl.$^5$ ............................................... G01F 1/58
[52] U.S. Cl. .................................. 73/861.12; 363/17; 73/861.16
[58] Field of Search ............ 73/861.12, 861.16, 861.17; 363/17, 98, 132

[56] References Cited

U.S. PATENT DOCUMENTS

| | | | |
|---|---|---|---|
| 3,942,377 | 3/1976 | Ginzburg et al. | 73/194 |
| 4,146,832 | 3/1979 | McConnell | 323/17 |
| 4,167,871 | 9/1979 | Shauger et al. | 73/861.16 |
| 4,283,958 | 8/1981 | Freund, Jr. et al. | 73/861.12 |
| 4,287,773 | 9/1981 | Freund, Jr. et al. | 73/861.12 |
| 4,325,261 | 4/1982 | Freund, Jr. et al. | 73/861.12 |
| 4,483,201 | 11/1984 | Haug | 73/861.12 |
| 4,663,976 | 5/1987 | Suzuki et al. | 73/861.12 |
| 4,672,303 | 6/1987 | Newton | 323/285 |
| 4,694,240 | 9/1987 | Grünsch | 323/285 |
| 4,717,994 | 1/1988 | Diaz et al. | 363/17 X |
| 4,727,755 | 3/1988 | Schmoock | 73/861.17 |
| 4,784,000 | 11/1988 | Gaertner | 73/861.12 |
| 4,794,506 | 12/1988 | Hino et al. | 363/17 X |
| 4,800,477 | 1/1989 | Esposito | 363/17 |
| 4,916,381 | 4/1990 | Gelcinskyj et al. | 323/285 |
| 4,967,332 | 10/1990 | Claydon et al. | 363/17 |
| 5,047,914 | 9/1991 | Dhyanchand et al. | 363/17 X |
| 5,065,301 | 11/1991 | Shioya et al. | 363/132 X |
| 5,079,957 | 1/1992 | Wehrs | 73/861.17 |
| 5,140,515 | 8/1992 | Menniti et al. | 363/132 X |
| 5,278,747 | 1/1994 | Falt et al. | 363/98 X |

FOREIGN PATENT DOCUMENTS 58-44314 3/1583 Japan.

OTHER PUBLICATIONS

Hexfet Databook, "Power Mosfet Application and Product Data," Published by International Rectifier in 1984 pp. A-1 and A-17.
Unitrode, "Linear Integrated Circuits Advanced Regulating Pulse Width Modulators," Dec. 1983 pp. 3-26 and 3-27.
Rosemount, "Model 8701 Magnetic Flowmeter Flowtube," Manual 4565, Dec., 1990.
Rosemount, "Model 8721C Magnetic Flowmeter Transmitter," Manual 4668, Mar., 1990.

Primary Examiner—Richard E. Chilcot, Jr.
Assistant Examiner—Elizabeth L. Dougherty
Attorney, Agent, or Firm—Westman, Champlin & Kelly

[57] ABSTRACT

A magnetic flowmeter system provides a volumetric flow rate output and has a coil receiving a magnetic field producing coil current from the current supply circuitry. The current supply circuitry includes an H-bridge transistor circuit having first and second switches which couple one of the first and second coil wires to a supply conductor. Third and fourth switches of the bridge circuit couple the other of the first and second coil wires to a second supply conductor. A control circuit periodically alternates conduction of the first, second, third and fourth switches to reverse the polarity of the coil current. A coil current control circuit generates a non-alternating output representing the sensed alternating coil current amplitude. The control circuit modulates the conduction duty cycle of the third and fourth switches as a function of the non-alternating output to regulate the coil current amplitude to a selected level.

10 Claims, 4 Drawing Sheets

BRIDGE PULSE CONTROLLED CONSTANT CURRENT DRIVER FOR MAGNETIC FLOWMETER

BACKGROUND OF THE INVENTION

The present invention relates generally to magnetic flowmeters. More specifically, the present invention relates to an improved H-bridge constant current driver design for a magnetic flowmeter.

A magnetic flowmeter measures the volumetric flow rate of a conductive fluid by detecting the velocity of the fluid passing through a magnetic field. Magnetic flowmeter systems typically include a flowtube assembly and a transmitter assembly. The flowtube assembly is installed in a process piping line, either vertically or horizontally, and includes a pipe section, a coil section, and electrodes. The coils are located on opposite sides of a cross section of the pipe. The coils, energized by a coil drive current from the transmitter, develop a magnetic field along the cross-section of the pipe. Two electrodes are located across the pipe from each other along a line which is perpendicular to the magnetic field. Fluid passing through the pipe is electrically conductive. As a result of the conductor movement through the magnetic field, an electric potential or electromotive force (EMF) is induced in the fluid which is detected by the electrodes. Operation is thus based on Faraday's law of electromagnetic induction.

Magnetic flowmeters are often used in applications where mixtures run through the flowtube. For example, in the paper industry, pulp, various chemicals and water run through the flowtube. In applications such as this, as the consistency of the fluid moving through the flowtube increases from a nominal value of 3% or 4% to a higher consistency of 10% to 15%, the paper pulp moving through the tube causes process noise to increase. As process noise increases, the signal-to-noise ratio decreases, which decreases the accuracy of the magnetic flowmeter output. To reduce the effects of process noise, attempts have been made to increase the magnetic field strength by increasing the coil drive current, which correspondingly increases the EMF induced in the fluid. Increasing the EMF induced in the fluid results in an increased signal-to-noise ratio and measurement accuracy.

Because the power dissipated in the magnetic flowmeter current driver and flowtube coils depends on the square of the current produced by the current driver, improving the signal-to-noise ratio by increasing the current results in substantially increased power dissipation. The increased power dissipation is a difficult design limitation. Therefore, an energy efficient AC current driver is needed to drive the flowtube coils at the increased current level.

SUMMARY OF THE INVENTION

In the present invention switches in a bridge which commutates coil current are also switched to regulate coil current, thus providing efficient energisation of magnetic field coils of a flowtube in a magnetic flowmeter system.

Current supply circuitry includes first and second switches which periodically couple either a first or second coil wire to a first supply conductor. Third, and fourth switches periodically couple the other coil wire to a second supply conductor. The current supply circuitry includes a circuit which causes the alternation of conduction of the first and second switches so as to alternate the polarity of the coil current. The current supply circuitry also includes a coil current sensor which generates a non-alternating output representing the sensed alternating coil current amplitude. As a function of the non-alternating output, the conduction duty cycle of the third and fourth switches is controlled in order to regulate the coil current amplitude to a selected level.

DETAILED DESCRIPTION OF THE PREFERRED EMBODIMENTS

Figure 1:
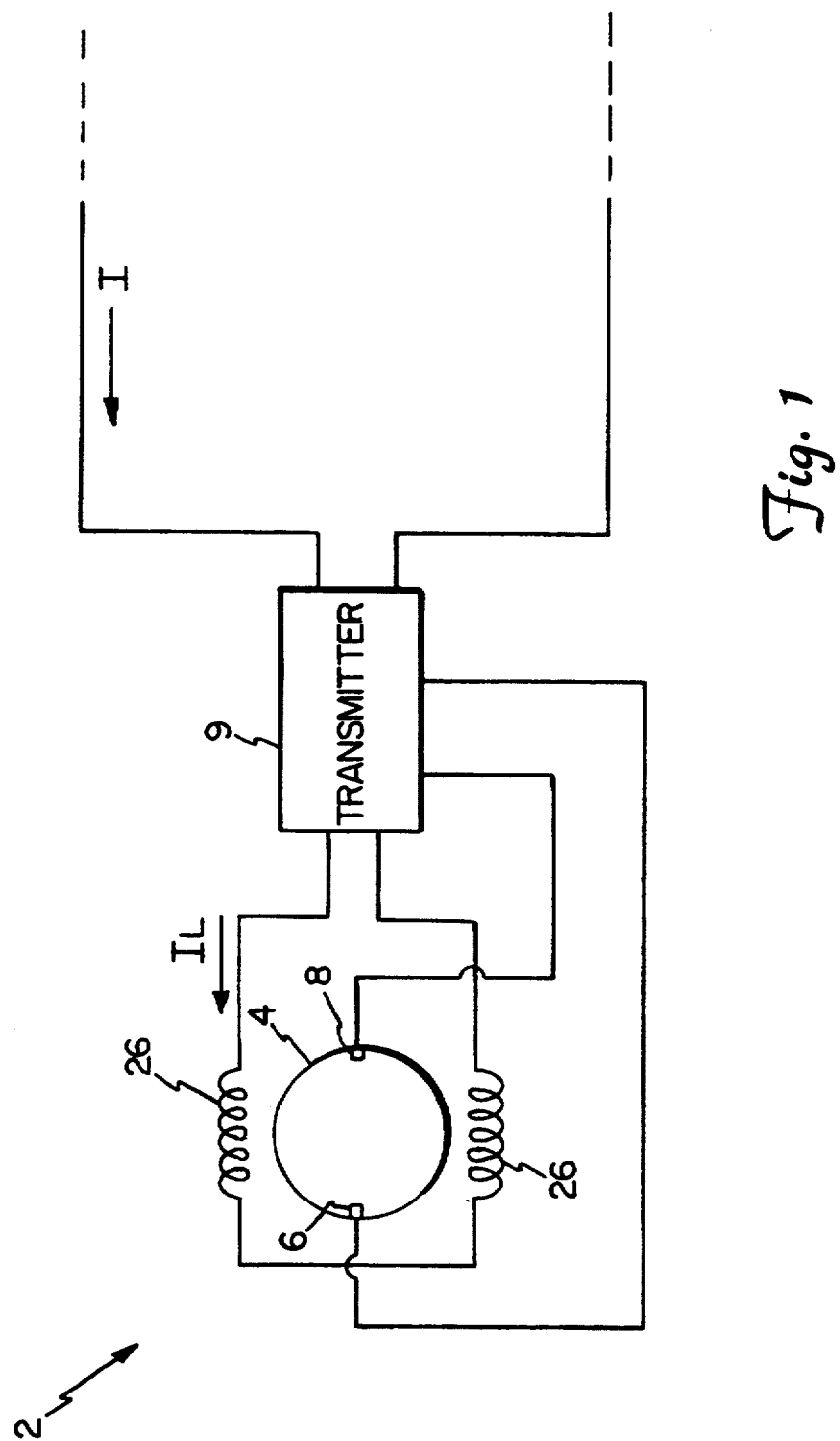
FIG. 1 is a block diagram of a magnetic flowmeter in a two-wire communication loop.

In FIG. 1, magnetic flowmeter system 2 connects to two-wire communication 4–20 mA loop carrying current I and an AC power line (not shown). Flowtube 4 carries a fluid flow. Transmitter 9 supplies coil drive current $I_L$ to coils 26 adjacent flowtube 4 which generate a magnetic field in the fluid. Electrodes 6, mount in flowtube 4 along a line perpendicular to the magnetic field in the fluid for sensing EMF induced in fluid flow. Transmitter 9 senses the EMF between electrodes 6, 8 and controls an output current I representative of the sensed EMF which is, in turn, proportional to fluid flow. Transmitter 9 transmits current I over a 4–20 mA current loop to a remote receiving station (not shown). Transmitter 9 can also transmit the flow output digitally using HART digital protocol.

Figure 2:
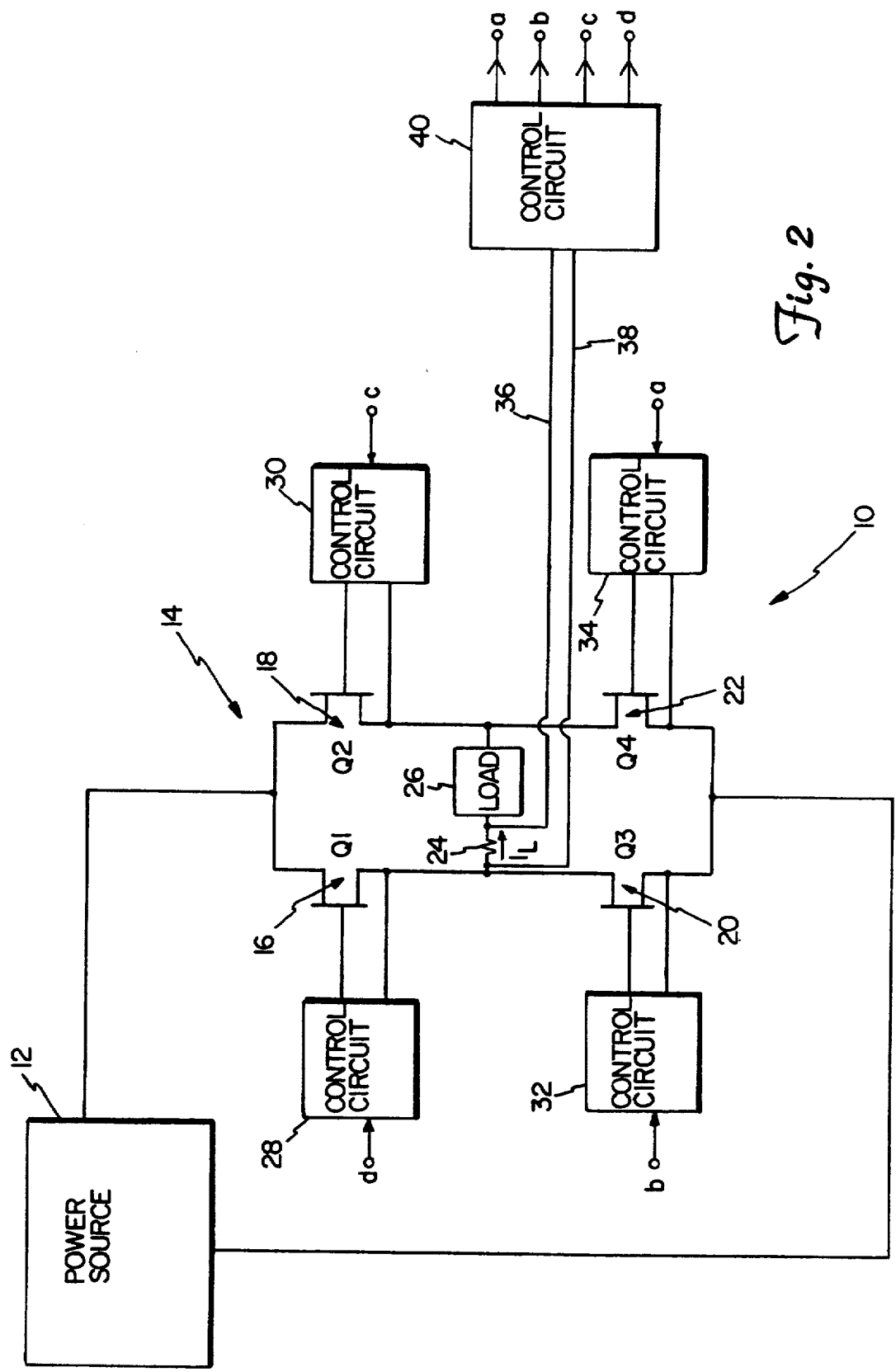
FIG. 2 is a schematic diagram of a preferred embodiment of the bridge pulse controlled constant current driver for a magnetic flowmeter.

In FIG. 2, H-bridge pulse controlled constant current driver 10 of magnetic flowmeter system 2 generates alternating drive current $I_L$ to a load or coils 26. In current driver 10, power source 12 energises a transistor bridge circuit 14. In bridge circuit 14, control circuits 28, 30, 32, 34 connect to the gates of field effect transistor (FET) 16, FET 18, FET 20 and FET 22 to switch them on in pairs to provide alternating, regulated current to load 26. Lines from power source 12 connect to drain terminals of FET's 16 and 18, and to source terminals of FETs 20 and 22. The source terminal of FET 16 and the drain terminal of FET 20 connect to one side of the load via series connection through current sensing resistor 24. Control circuits 28, 30, 32 and 34 convert input ON and OFF logic levels to desired bias levels compatible to the gates of transistors 16, 18, 20, 22 for switching between ON and OFF states.

Control circuit 40 couples to sense resistor 24 via lines 36, 38 for sensing a potential across resistor 24 representative of the coil current $I_L$. Control circuit 40 produces control outputs a, b, c and d as a function of the sensed current. Outputs a, b, c and d provide logic levels to circuits 34, 32, 30 and 28 respectively.

Power source 12 is a DC power supply which rectifies AC line power. Bridge circuit 14 periodically alternates, or commutates, current from power source 12 to load 26 and sense resistor 24.

During a first alternation or conduction period, control signals a and d causes FET's 16 and 22 to switch off or stop conducting, while control signal c causes FET 18 to switch on or conduct and control signal b oscillates in a controlled manner between ON and OFF states to provide duty cycle control of conduction of transistor 20. During the first alternation, current $I_L$ has a first polarity and control circuit 40 modulates control signal b to control the conduction duty cycle of FET 20 to produce a substantially constant current through inductive load 26 during the first alternation.

In a similar mode of operation during a second alternation or conduction period, control signals b and c causes FET's 20 and 18 to switch off or stop conducting, while control signal d causes FET 16 to switch on or conduct and control signal a oscillates in a controlled manner to provide duty cycle control to switch transistor 22 into conduction in a controlled manner. During the second alternation, current $I_L$ has a second polarity opposite the first polarity and control circuit 40 modulates control signal "a" to control the conduction duty cycle of FET 22 to produce a substantially constant current through load 26 during the second conduction period.

In FIG. 2, the bridge transistors 20, 22 regulate load current $I_L$ to a constant value based on feedback of actual load current by controlling the duty cycle of conduction. This avoids the need for a load current regulator separate from the bridge and its associated additional power loss.

Figure 3:
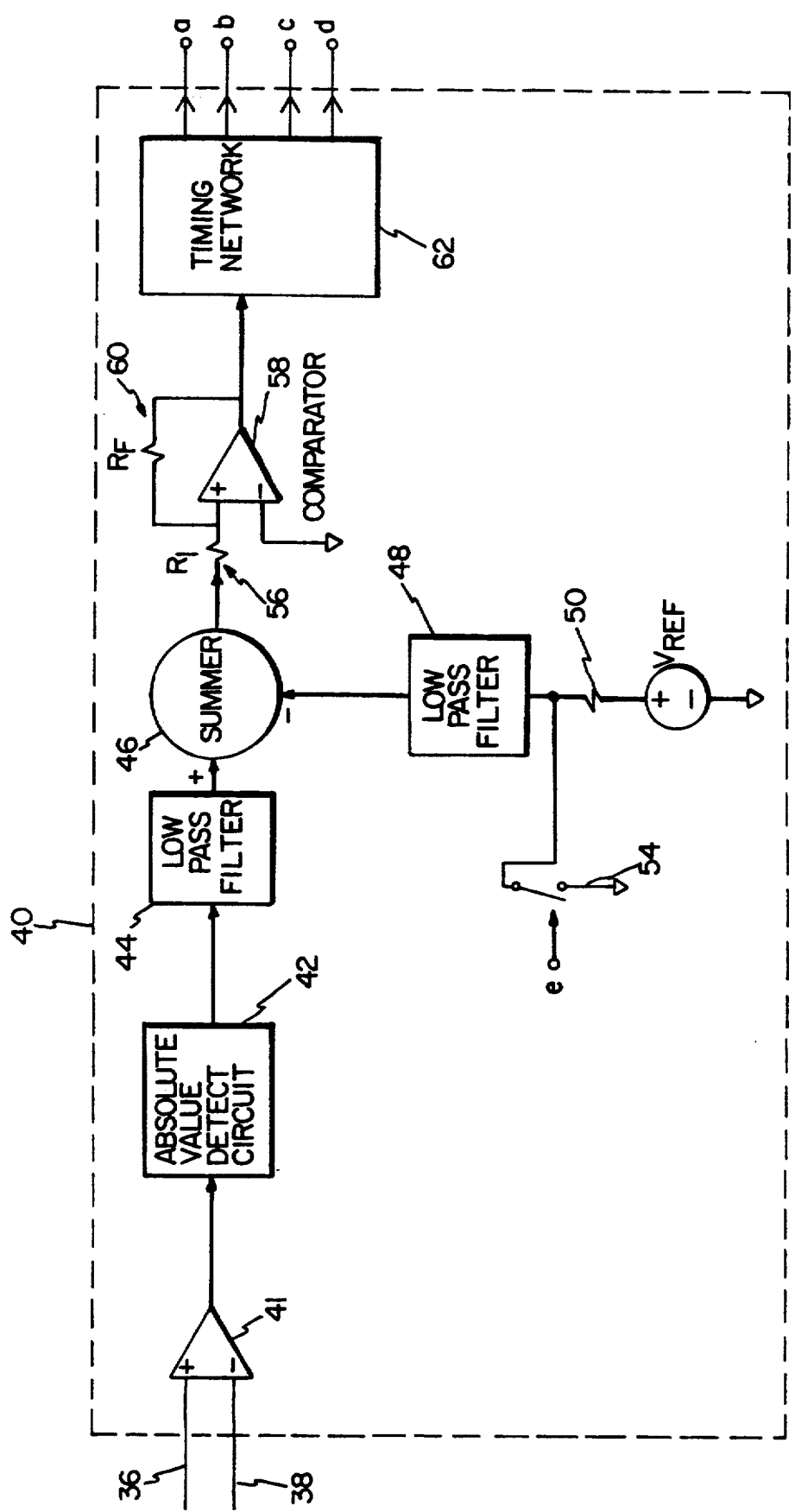
FIG. 3 is a schematic diagram of the control circuitry of the bridge current driver.

In FIG. 3, control circuit 40 of FIG. 2 is shown in more detail. In control circuit 40, differential amplifier 41 senses a potential across sense resistor 24 (FIG. 2) via lines 36, 38. The output of differential amplifier 41 represents current $I_L$ and thus alternates polarity. Absolute value detector circuit 42 provides electronic rectification of the output of amplifier 41 and provides a non-alternating, rectified, absolute value output representative of $I_L$ to low pass filter 44. The output of low pass filter 44 connects to a positive input terminal of summing network 46. A negative input terminal to summing network 46 connects to the output of low pass filter 48.

The input to low pass filter 48 connects both to resistor 50 and switch 54. Reference potential $V_{REF}$ is connected between resistor 50 and a ground potential. Switch 54 selectively connects low pass filter 48 to ground under the control of control signal "e" explained later. The output of summing network 46 connects to the positive input of comparator 58 through input resistor 56. The negative input terminal of comparator 58 connects to ground. Feedback resistor 60 connects the positive input terminal and the output of comparator 58 to provide positive feedback or hysteresis to reduce output noise of comparator 58. The output of comparator 58 provides an error signal indicating a deviation of the load current amplitude from its desired or regulated value. The error signal from comparator 58 connects to timing network 62 which produces output control signals a, b, c and d, explained in more detail in FIG. 4.

Filter 44 eliminates electric potential spikes during switching which arise due to the inductance of load 26. An alternative method of eliminating these spikes is to use a blanking circuit. Elimination of spikes improves feedback stability.

In most instances, the negative input of summing network 46 is $V_{REF}$, which is used to set the coil current to a desired level. Low pass filter 48 filters the reference potential $V_{REF}$ to provide loop stability.

In instances where coils can overheat, control signal e can connect the input of filter 48 to ground to effectively shut the coil current off intermittently to allow the coils to cool. The use of control signal e to shut the coil current off is limited to smaller flowtubes which have lower heat dissipation capability and is done on a cyclic basis. A timer can generate control signal e, or alternatively, control signal e can be derived from a temperature sensor on the coils 26.

Figure 4:
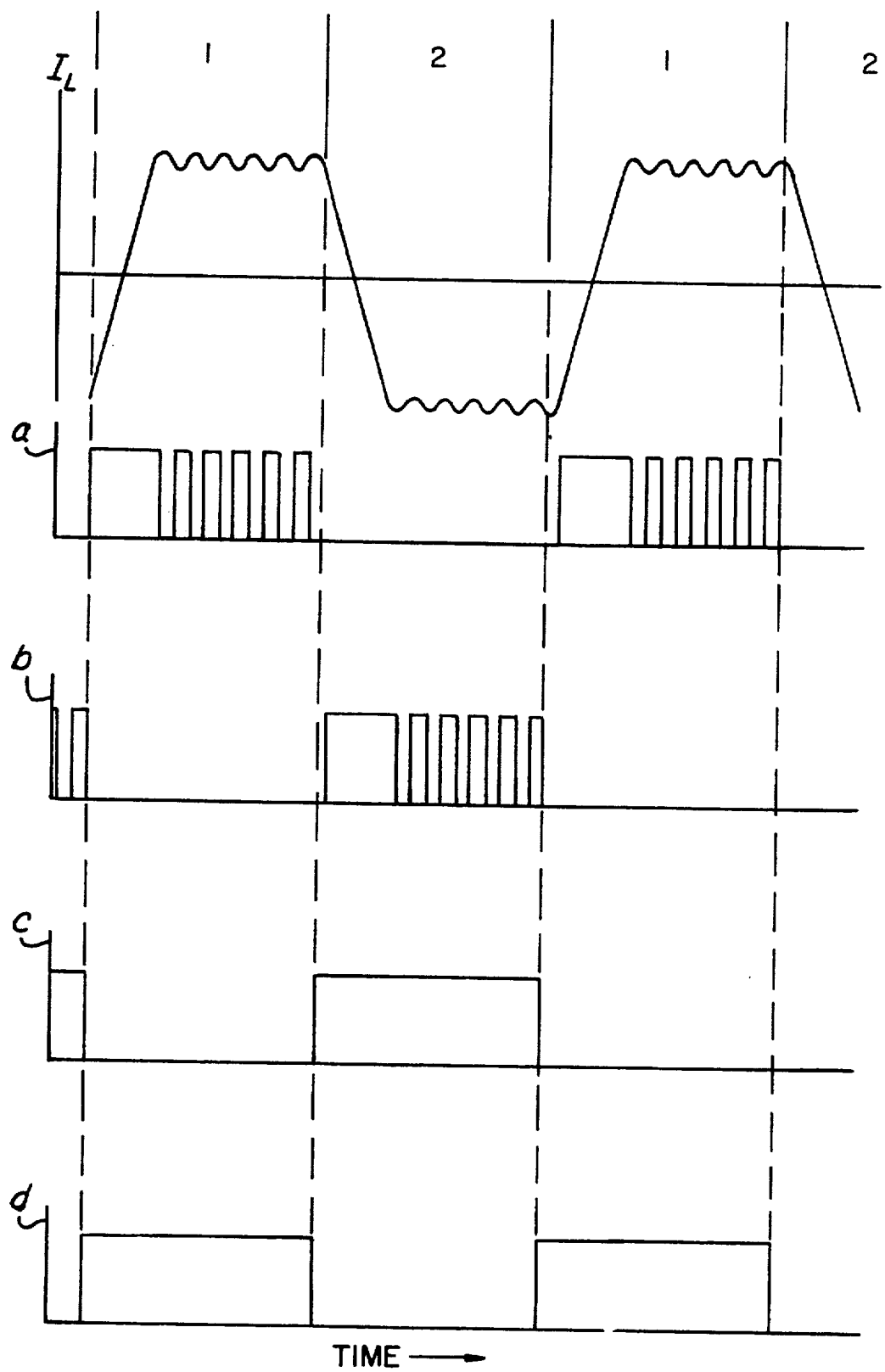
FIG. 4 is a timing diagram illustrative of the relationship between the timing signals produced by the control circuit and the current through the magnetic flowmeter coils.

FIG. 4 is a timing diagram showing the control of the H-bridge conduction by timing network 62. Alternation of load current $I_L$ between first (1) and second (2) polarities is shown. In one embodiment, conduction in FETs 20 and 22 oscillates at a frequency of about 2 KHz. Oscillation frequency and modulation of duty cycle are generated by timing network 62. When the load current is below the desired value, the duty cycle is increase to provide additional current. When the load current is above the desired value, the duty cycle is decreased to reduce the current. Because of the tight feedback control, deviations of the current during steady state conditions are small, and the deviations are exagerated in FIG. 4 for clarity. The pulse width or duty cycle can be varied over the range 0-100%.

Although the present invention has been described with reference to preferred embodiments, workers skilled in the art will recognize that changes may be made in form and detail without departing from the spirit and scope of the invention.

What is claimed is:

1. A magnetic flowmeter for measuring a fluid flow, comprising:
  a flowtube assembly receiving the flow having a coil with first and second coil wires for receiving a coil current producing a magnetic field generating an EMF in the fluid representative of the flow;
  means for sensing the EMF and generating an output indicating the flow;
  current supply means including first and second switches for coupling the first and second coil wires respectively to a first supply conductor, and third and fourth switches for coupling the first and second coil wires respectively to a second supply conductor;
  means for alternating conduction of the first and second switches to alternate the polarity of the coil current;
  a coil current sensor generating a non-alternating output representing the sensed alternating coil current amplitude;
  a control circuit for controlling conduction duty cycle of the third and fourth switches as a function of the non-alternating output to regulate the coil current amplitude to a selected level.

2. The magnetic flowmeter of claim 1 wherein the coil current sensor comprises:
  a sense resistor connected in series with the coil; and
  means for detecting an absolute value of a potential developed across the sense resistor and providing an absolute value output.

3. The magnetic flowmeter of claim 2 wherein the control circuit includes:
  a reference level; and
  a summing network coupled to the means for detecting an absolute value and the reference level, wherein the summing network provides a summing network output representative of a comparison between an absolute value of electric current flowing through the coil and the reference level.

4. The magnetic flowmeter of claim 3 including an amplifier having a first input and a second input connected across the sense resistor and an output connected to the means for detecting an absolute value.

5. Drive circuitry for a magnetic flowmeter having a flowtube and a coil positioned adjacent the flowtube, the coil having a first connection and a second connection, comprising:

first, second, third and fourth switches each having a switch control input controlling switching of a first switch connection coupled to a power source to a second switch connection coupled to the coil, the second switch connections of the first and third switches coupling to the first coil connection and the second switch connections of the second and fourth switches coupling to the second coil connection;

means for sensing electrical current flowing through the coil; and control means coupled to the means for sensing and the control inputs of the switches for activating the first switch simultaneous with modulation activation of the fourth switch responsive to sensed coil current, and for alternately activating the second switch simultaneous with modulating activation of the third switch responsive to sensed current flowing through the coil.

6. The drive circuitry of claim 5 wherein the means for sensing comprises a sense resistor.

7. The drive circuitry of claim 5 wherein the control means includes means for sensing an absolute value of electrical current flowing through the coil and providing an absolute value output.

8. The drive circuitry of claim 7 wherein the control means further includes:

means for providing a reference level; and means for comparing electrical coil current with a reference current level based upon the reference level.

9. The drive circuitry of claim 8 wherein the means for comparing comprises:

a summing network coupled to the means for sensing an absolute value and the means for providing a reference level for summing the absolute value output with the reference level and providing a summed output; and means for amplifying the summed output.

10. The drive circuitry of claim 6 including an amplifier connected across the sense resistor.

* * * * *

UNITED STATES PATENT AND TRADEMARK OFFICE
CERTIFICATE OF CORRECTION

PATENT NO. : 5,372,045
DATED : December 13, 1994
INVENTOR(S) : Robert K. Schulz et al.

It is certified that error appears in the above-indentified patent and that said Letters Patent is hereby corrected as shown below:

Column 2, line 32, after "6," insert --8--.

Signed and Sealed this

Twenty-second Day of August, 1995

Attest:

BRUCE LEHMAN

Attesting Officer    Commissioner of Patents and Trademarks